United States Patent [19]

Guilhem

[11] Patent Number: 4,806,244
[45] Date of Patent: Feb. 21, 1989

[54] COMBINED MEMBRANE AND SORPTION PROCESS FOR SELECTIVE ION REMOVAL

[75] Inventor: Michel Guilhem, Strasbourg, France
[73] Assignee: The Dow Chemical Company, Midland, Mich.
[21] Appl. No.: 73,033
[22] Filed: Jul. 14, 1987

[30] Foreign Application Priority Data

Jul. 15, 1986 [DE] Fed. Rep. of Germany ....... 3623796

[51] Int. Cl.⁴ ........................ B01D 13/00; B01D 15/04
[52] U.S. Cl. ..................................... 210/638; 210/669; 210/790
[58] Field of Search ............... 210/638, 651, 654, 669, 210/683, 790

[56] References Cited

U.S. PATENT DOCUMENTS 4,206,048 6/1980 Guter ................................. 210/638
4,479,877 10/1984 Guter ................................. 210/670
4,661,257 4/1987 Kreevoy et al. ..................... 210/638

OTHER PUBLICATIONS

"Nitratreduzierung in Trinkwasser un Brauchwasser fur Lebensmittelbetriebe", by Rolf Nagel, *Wasserwirtschaft*, 75 (1985), No. 6, pp. 257–262 (with translation).
"Reverse Osmosis and/or Ion Exchange? Using Them Together For Water Demineralization"., Product literature from the Dow Chemical Company.

*Primary Examiner*—Ivars Cintins

[57] ABSTRACT

A combined membrane/sorption process is used to selectively remove ions from liquid streams. As an example, nitrate ions can be more effectively removed from an aqueous stream also containing sulfate ions. Sulfate ions normally are not required to be removed from drinking water, but are typically sorbed by the available ion exchange resins and result in inefficient use of the ion exchange capacity. The disclosed process and apparatus use an ion selective membrane to first remove the sulfate ions from the stream and then remove the nitrate ions by ion exchange.

8 Claims, 1 Drawing Sheet

COMBINED MEMBRANE AND SORPTION PROCESS FOR SELECTIVE ION REMOVAL

BACKGROUND OF THE INVENTION

This invention relates to the use of a combined membrane and sorption system for selectively removing certain ions from a liquid. In another aspect, the present invention is an apparatus for selective ion removal from liquids.

The selective removal of specific ions from a liquid or solution additionally containing other types of ions is necessary or desired in many areas of technology, such as when the selected ion is or can be converted to a valuable product or the selected ion is undesirable in the use for which the liquid is intended. For example, ions of valuable metals can be recovered from solutions via ion exchange and then further processed by conversion into the metal. Various processes are currently used to remove and/or concentrate ions for these reasons. Such processes include ion exchange, electrodialysis, reverse osmosis, chemical reduction and various biological techniques.

The level of some ions, such as nitrates, represent a health hazard when presented above a concentration considered safe for potable water. The high levels of nitrates found in ground water supplies in some locations necessitate treatment of these waters prior to consumption.

Adaptations and/or combinations of one or more of the known ion removal systems have been suggested for use in nitrate removal from water. In *Wasserwirtschaft* 75 (1985), No. 6, Pages 257 to 262, there is a summary of the standard nitrate removal systems. German Pat. Nos. 3,301,054 and 3,010,538 discuss strong-base anion exchange methods to remove nitrates from water.

The principal deficiency in these and other ion exchange techniques which attempt to remove nitrate ions is the failure of these systems to selectively and economically remove the nitrate ions when sulfate ions are present. Substantial portions of the capacity of the commercially available anion exchange resins are typically used to sorb sulfate ions. Regeneration of the resins is similarly inefficient because of the need to desorb sulfate ions.

In U.S. Pat. No. 4,479,877, there is a description of the removal of nitrates by ion exchange methods and the problems encountered in such processes. This patent describes a specialized strong-base anion exchange resin which is recommended for use in nitrate removal from drinking water because of its selectivity of nitrates in preference to sulfates. This type of resin is a very specialized resin and suffers from the various other disadvantages of ion exchange systems.

SUMMARY OF THE INVENTION

The present invention is an improved sorption process for removal of a first ion from a liquid containing a second ion which competes for removal capacity. The process comprises the steps of:

(a) contacting the liquid with a first surface of an ion-selective membrane with a chemical potential difference across the membrane so as to separate the liquid into first and second portions, the first portion comprising a lower concentration of the second ion than the original liquid and a lower ratio of the second ion to the first ion than in the original liquid, and (b) contacting the first portion of the liquid with a sorbant so as to sorb the first ion.

In another aspect, the present invention is a sorption apparatus for the selective removal of a first ion from a liquid also containing a second ion which competes for removal capacity. The apparatus (a) an ion-selective membrane adapted so that, when a liquid containing a first and a second ion contacts one surface of the membrane, the liquid is separated into two portions, the first portion comprising a lower concentration of the second ion than the original liquid and a lower ratio of the second ion to the first ion than in the original liquid, and (b) a sorption element which receives the first portion from the membrane and removes the first ion.

DETAILED DESCRIPTION OF THE INVENTION

Figure 1:
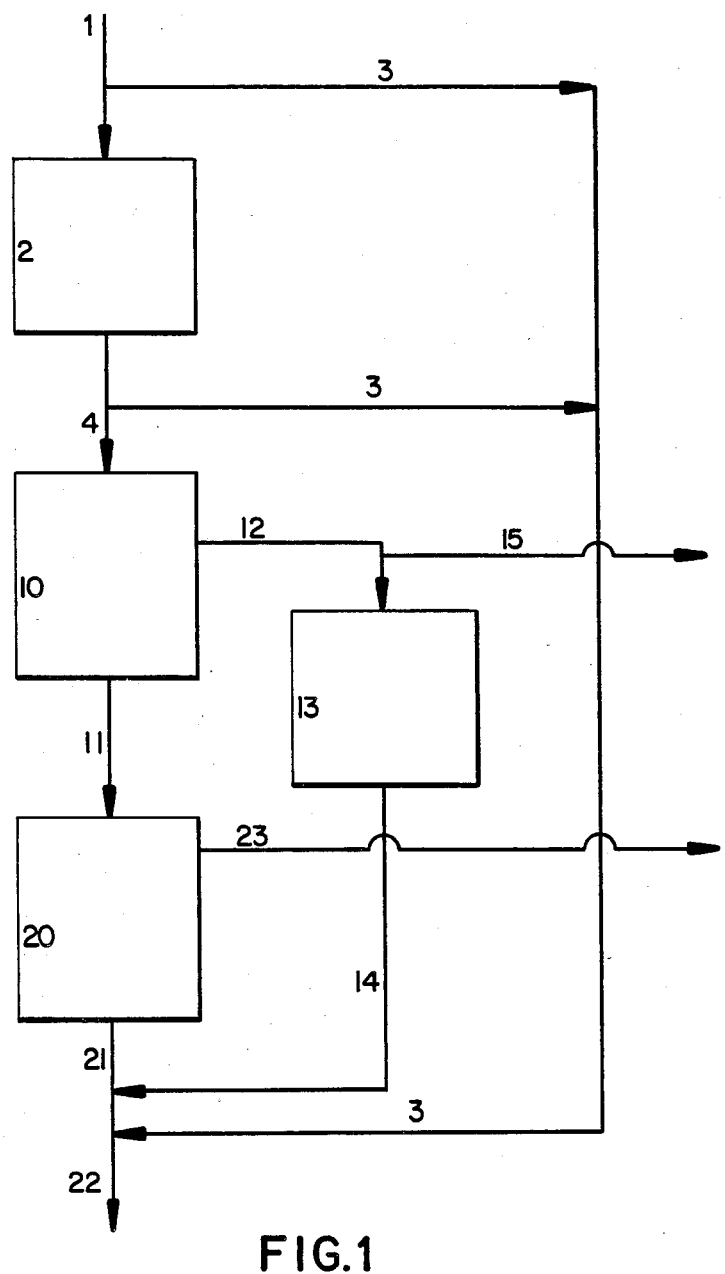

The present invention can be used for ion removal from many different types of liquids and liquid streams. Preferred are aqueous streams, optionally but not preferably containing ethanol or other cosolvents.

Although suited for use with ion-containing liquids of many different types, the process and apparatus of the present invention have been found to be particularly well suited for application in the treatment of water prior to consumption by humans and/or other mammals. The treatment of naturally occurring water for such purposes typically requires at least partial removal of one or more selected ions but it may be desirable not to remove ions which are believed beneficial.

The apparatus and process of the present invention can be used in situations where the total dissolved solids (TDS) level in the water is very high, such as for sea water, where the TDS is often greater than 30,000 parts per million (ppm). It is preferred, however, to start with water containing less than 10,000 ppm TDS and more preferably less than 1,000 ppm TDS and remove only the selected ion or ions which are objectionable on health grounds. Water having these lower TDS levels (less than 1,000 ppm) is usually otherwise acceptable in terms of the taste and smell of the water and there generally exists only the health concerns raised by the unacceptably high level of the nitrate ion concentration o other deleterious ions. In preferred embodiments of the invention, the membrane and ion exchange resin combination used to reject the sulfate ions and remove nitrate ions, respectively, can operate with maximum levels of efficiency.

More specifically, it is found that fresh surface and ground water will commonly contain less than 1,000 ppm TDS, with nitrate levels of up to 200 milligrams per liter (mg/l) and sulfate levels of 500 mg/l (measured, for example, by ion chromatography). Sometimes there are also low levels of phosphates which will be handled similarly to the sulfates. For water of this typical composition, it is really only the nitrate level that needs to be lowered, generally to the range of 20 to 40 mg/l, with the level of total ions, in general, being acceptable if not desirable.

The use of various types of sorbants for ion removal by non-catalytic, fluid/solid reactions are well known. Examples of such sorbants include zeolites and hydrocarbon-based materials of synthetic and natural origin which exhibit some degree of selective affinity for one or more ionic species. Ion exchange resins are well-known sorbant materials commonly used for ion removal and are preferred sorbants for use in the present invention. The various types of functional groups or moieties associated with the resin either exchange other ions for the ion desired to be removed or chelate or fix the selected ion.

In the particular situation where nitrate anions are desired to be removed from aqueous solutions, strong-base anion exchange resins are most preferred for this function. The various strong-base anion exchange functional groups and polymer resins with which they are associated, including their relative advantages and disadvantages, are well known to one skilled in the art. These types of resins are preferred for use in nitrate removal according to the present invention. Such resins typically feature trimethylammonium or dimethylethanolammonium functional groups, referred to respectively as type 1 or type 2 resins.

The various means for employing ion exchange resins and other sorbant materials are also generally well known in the art. Such systems include packed or fluidized beds of these materials. These beds can be operated in a batch method whereby one bed is used until ion exchange capacity is substantially exhausted, at which time the feed stream is either stopped or diverted to another, regenerated bed. In some systems, continuous operation is attempted by continual removal of a portion of the used resin and replacement with fresh resin. In either operation, the exhausted sorbant material must be regenerated prior to further use.

The sorbant regeneration techniques known in the art are suitable for use with the sorbant material used in the practice of the present invention. In general, one can use the most efficient techniques for the particular sorbant material and bed structure that have been employed. The known regenerates for the strong-base anion exchange columns typically used in nitrate removal include solutions containing ammonium or alkali metal chloride, alkali metal bicarbonate and/or carbon dioxide. Concurrent flow regeneration systems can be used with such resins, with counterflow regeneration systems being recognized to provide high efficiencies in ion exchange resin regeneration. When using KCl or NH$_4$Cl solutions in the regeneration, the resulting solution is highly suited for use as fertilizer, eliminating a problem of disposal of the used regenerating solution.

For the particular sorbant material which is used and the selected ion which is desired to be removed, the choice of the membrane element becomes very important. The membrane must possess a high selectivity between the ion which is desired to be removed and the similarly charged, non-selected ions which compete with the selected ions for removal capacity of the sorbant. In most cases this will mean that the membrane will have a high rejection rate for the non-selected ions and a relatively low or, if attainable, a negative, rejection rate for the selected ions. If a membrane has a high rejection ratio for a first ion relative to a second ion, the concentration of the first ion in the permeate solution which passes through the membrane is decreased relative to that of the second ion in the permeate. If a membrane does not reject an ion, the ion concentration in both the permeate and the reject portions will remain essentially the same as in the original liquid. It is also possible for a membrane to have a negative rejection rate for an ion if the ion's concentration in the permeate becomes greater than the ion's concentration in the original liquid.

Membranes generally suitable for use in the practice of the present invention are known and are commercially available. Such membranes can include reverse osmosis membranes, nanofiltration membranes and ultrafiltration membranes which will exhibit the necessary selectivity for the particular ionic species. Preferred for use in the present invention are the nanofiltration membranes, which fall between reverse osmosis and ultrafiltration membranes in terms of the size of the species which will be passed through the membrane. As used herein, the term "nanofiltration membrane" refers to a membrane having micropores or openings between chains in a swollen polymer network, which micropores or openings are estimated to have an average diameter on the order of about 10 angstrom (i.e., one nanometer). The membranes commonly known as reverse osmosis membranes will tend to reject practically all ions and therefore may not effectively separate ionic species. Ultrafiltration membranes, on the other hand, will typically not reject most simple ionic species but reject higher molecular weight molecules as a function of their molecular weight. Certain nanofiltration membranes have been found to exhibit very good levels of selectivity between selected and non-selected ions. Illustrative ion-selective nanofiltration membranes preferred for use in the practice of the present invention are further described in U.S. Pat. No. 4,259,183, which is incorporated by reference. Such a nanofiltration membrane can consist of a thin film composite membrane having a polyamide discrimination layer supported on a porous substrate. The polyamide discriminating layer can be prepared by reaction of piperazine and/or a substituted piperazine with one or more acid halides. Preferably, the polyamide is prepared from piperazine and trimesoyl chloride and, optionally, a diacyl halide such as isophthaloyl chloride. Examples of such membranes include the NF-40 or NF-50 nanofiltration elements, commercially available from FilmTec Corporation, Minneapolis, Minn. These membrane elements have been found very suitable for the embodiment of the present invention where a strong-base anion exchange resin is thereafter used to remove nitrates from water. This membrane has been found to be particularly effective in rejecting a high proportion of the sulfate ions which are commonly found in water as well as the other large, divalent anions and cations. The permeate portion from such membrane containing low levels of sulfate ions is then supplied to the strong-base anion exchange resin where the nitrate ions are very effectively removed by the resin.

The selected type of membrane can be employed in the process according to the present invention in any of the known membrane constructions. Such membrane constructions include spiral wound modules such as the aforementioned commercial nanofiltration element, plate and frame constructions, hollow fibers, and arrays of tubular membranes. Spiral wound membrane devices are generally preferred.

An embodiment of the process and apparatus according to the present invention is illustrated in FIG. 1.

In FIG. 1, the raw feed liquid (1) contains a first or selected ion which is desired to be removed from the liquid by the sorbant material and a second or non-selected ion which, although not necessary to be removed, is ordinarily removed by the sorbant and thereby reduces the capacity or ability of the sorbant to remove the first or selected ion. This liquid can be treated in one or more batches, but is preferably in the form of a stream which can be supplied continuously to the membrane element. The feed liquid (1) can be obtained from many sources, including naturally occurring surface or ground waters or chemical processes. Prior to the feeding of the stream to the membrane element, there can be an optional pretreatment element (2) and the optional removal or by-pass of a portion of this raw water feed (3). The various pretreatment techniques which can optionally be used in preparing a raw feed for separation by the membrane element are well known and include, for example, softening, pH adjustment, prefiltration, chlorination, anti-scalant addition, flocculation, and/or temperature adjustment. Pretreatment systems are further discussed in U.S. Pat. No. 4,574,049, which is incorporated by reference. The amount and types of any such pretreatments will obviously depend upon the source of the raw feed liquid and its inherent characteristics.

The feed stream (4) which is supplied to the membrane element (10) is thereby separated into a first portion (11) and a second portion (12). The essential characteristic of the membrane element (10) is to achieve a lower concentration of the second ion(s) relative to the concentration of the first ion(s) in the first portion (11) to enable this first portion to have the first or selected ions removed more efficiently therefrom. By this process, there will be produced the second portion (12) which should contain a relatively higher concentration of the second ions. In the preferred embodiment of the present invention, where nitrate ions are desired to be removed from an aqueous stream also containing sulfate ions, the second portion (12) is the rejected stream from a nanofiltration membrane having a good sulfate ion rejection rate. The first portion (11) is therefore the portion of the stream which has permeated through the membrane and has a lower concentration of sulfate ions. Ideally, the membrane element exhibits little or no rejection of the nitrate ions. As is well known to those skilled in the art of membranes and water treatment, the membrane element may comprise one or more separate membrane elements of the same or different constructions combined in series and/or parallel configurations to produce the desired separation capacity.

From the membrane element, the first portion (11) of the liquid is then supplied to the sorbant material (20) As mentioned above, the essential characteristic of the sorbant material is its ability to remove from the liquid the selected ion. Examples of sorbants include zeolites and ion exchange resins. If an ion exchange resin is used, it can be one or more of the known commercially available polymeric io exchange resins with functional moieties which will remove the selected ion and/or exchange for it one or more less detrimental ions. In the preferred embodiment of the present invention, a strong-base anion exchange resin is used as the sorbant material to remove nitrate anions from an aqueous stream. Suitable functional groups include the trimethylammonium groups of type 1 resins and the dimethylethanolammonium groups of type 2 resins, or other groups which utilize the quaternized ammonium moiety or similar anion exchange moiety. Ion exchange beds of such resins, although proving somewhat ineffective in the prior art processes where the water contained fairly high sulfate levels, have proven very effective in the practice of the present invention to continuously remove a large portion of the nitrate ions in an aqueous sulfate-containing stream with sufficient capacity such that the number of required regenerations for an operating period is minimized. The purified stream from the sorbant material (21) is then available for the desired disposition.

In the preferred embodiment of the present invention, all or part of the second portion (12) produced by the membrane element is added to the purified liquid which is obtained from the sorbant material. In the most preferred aspect of the present invention, where it is esired to continuously remove nitrate ions from an aqueous stream, all or part of the rejected portion from the membrane may receive optional treatment (13) and the resultant stream (14) is recombined with the purified aqueous stream (21) after it has left the ion exchange resin to produce the product stream (22).

Depending upon the composition of the raw feed and the reduction in concentration sought (1) it may be possible or desirable to bypass at least a portion (3) with or without the optional pretreatment (2) around the membrane element (10) and the sorbant material (20) and directly or indirectly recombine this stream (3) with the product stream (22).

In a preferred embodiment of the present invention, the membrane element produces a first permeate portion (11) having removed therefrom essentially all of the divalent ions and impurity molecules found in the raw feed water. The second portion (12) will therefore be the reject portion which has concentrated therein all of these various ions and molecules which may be either desirable or undesirable for the ultimate disposition of the product water (22). This second portion (12) can therefore be very conveniently and efficiently treated by other techniques to remove other undesirable elements of the water stream. For example, activated carbon can be employed in such optional treatment (13) to remove other undesirable components present in the stream such as pesticides or herbicides.

In the nitrate removal embodiment of the present invention, there are several other surprising advantages according to the present invention. The membrane which has rejected the majority of the sulfate ions has similarly screened or rejected not only the bacteria which are known to collect and grow in ion exchange beds but also the organic molecules produced in the degeneration of cellulosic materials, which organic materials foul the ion exchange resin and are a food source for any bacteria present in the ion exchange resin. A further benefit can be obtained by the partial removal or "bleed-off" (15) of the second portion (12) produced by the membrane. Depending on the content of magnesium and/or calcium in the original water supply which will be concentrated in the second portion (12), this bleed-off (15) may be desired to soften the water.

The techniques for regeneration of the sorbant material will vary according to the particular type of sorbant and its method of employment. For example, when the sorbant is an ion exchange resin which has been used to remove nitrates from an aqueous liquid, a solution of other anions such as chloride or bicarbonate salts is applied cocurrently or counter-currently. The other anions should be selected so as to displace the fixed nitrate ions from the ion exchange resin. This regeneration will produce an amount of regenerate waste brine (23) containing a high concentration of the nitrate ions. This waste brine (23) is then appropriately disposed of and/or treated in an additional process, such as a biological process, which destroys the nitrates. In the latter case, it is possible to have a zero discharge operation.

To illustrate some of the benefits obtainable according to the practice of the present invention, Table I below shows the dramatic increase in efficiency which will result when the present invention is utilized in the removal of nitrates from drinking water as compared to the prior art method of using only ion exchange. In this illustration, the data are calculated from the data available regarding the individual unit operations. Two raw water feed streams are considered, the first comprising 100 milligrams sulfate ion per liter and 100 milligrams nitrate ion per liter, and a second feed stream comprising 150 milligrams sulfate per liter and 100 milligrams nitrate per liter. Such ion levels can often be found in typical, naturally-occurring ground and surface water supplies commonly used to provide drinking water. The calculations are based on the use of about 5,380 liters of Dowex ® SBR-P brand ion exchange resin, a commercially available strong-base anion exchange resin having trimethylammonium functional groups. The membrane system is based on NF40-8040 nanofiltration elements available from FilmTec Corporation which utilize a polyamide barrier layer. The system is composed of 17 pressure vessels each containing 6 spirally wound elements 40 inches long and 8 inches in diameter. The system is arranged to have a first stage with 11 of the pressure vessels in parallel, with the reject portion going to a second stage which has the other 6 vessels in parallel. The feed water is supplied to the membrane element at a rate of 100 cubic meters per hour (m$^3$/hr) and under a pressure of 0.6 mega Pascals (MPa). As typically done with a stand-alone anion exchange column, a raw-water bypass is used where the ratio of the bypass water flow rate to ion exchanged water flow rate is 0.28. The ion exchange columns with and without the membrane element are run until nitrate leakage through the column exceeds 10 milligrams per liter (mg/l).

In the regeneration of both systems, 1.5 bed volumes of a 6 percent solution of NaCl is applied counter-currently to the ion exchange resin at a rate of 90 grams NaCl per hour, followed by a cocurrently applied rinse of 2 bed volumes of nitrate-free, ion exchanged, permeate water.

Table I compares the prior art system to the present invention with the first raw water feed composition and Table II compares the two systems using the second raw water feed composition containing greater sulfate ion concentration.

TABLE I

| WATER SUPPLY: 100 mg/l Nitrate, 100 mg/l Sulfate | | |
|---|---|---|
| | "Stand Alone" Ion Exchange* | Combination Membrane/Ion Exchange |
| Ion Exchange Cycle time (hrs) | 12 | 24.3 |
| Ion Exchange Resin Content | | |
| Sulfate (eq/l) | 0.36 | 0.07 (approx.) |
| Nitrate (eq/l) | 0.28 | 0.57 (approx.) |
| Ratio of Regenerant Required to Nitrate Removed: | | |
| (eq. Cl per eq. NO$_3$) | 5.5:1 | 2.70:1 |
| (kg NaCl per kg N) | 23.0:1 | 11.3:1 |
| Waste Brine Produced (m$^3$/day) | 37.7 | 16.3 |

*Comparative experiment, not an example of the present invention.

As can be seen in Table I above, the prior art process produces 131 percent more waste brine than the process according to the present invention. As recognized by those skilled in this area of technology, the reduction in waste brine which must be further processed and/or disposed of in some fashion is highly advantageous, both economically and ecologically. Table II below shows that with somewhat higher sulfate concentrations, an even greater reduction in waste brine is observed.

TABLE II

| WATER SUPPLY: 100 mg/l Nitrate, 150 mg/l Sulfate | | |
|---|---|---|
| | "Stand Alone" Ion Exchange* | Combination Membrane/Ion Exchange |
| Ion Exchange Cycle time (hrs) | 6.43 | 23.0 |
| Ion Exchange Resin Content | | |
| Sulfate (eq/l) | 0.49 | 0.10 (approx.) |
| Nitrate (eq/l) | 0.15 | 0.54 (approx.) |
| Ratio of Regenerant Required to Nitrate Removed: | | |
| (eq. Cl per eq. NO$_3$) | 10.3:1 | 2.85:1 |
| (kg NaCl per kg N) | 43.0:1 | 11.9:1 |
| Waste Brine Produced (m$^3$/day) | 70.2 | 16.3 |

*Comparative experiment, not an example of the present invention.

With a sulfate concentration of 150 mg/liter, not uncommon in water from which nitrate ions must be removed, the prior art produces about 330 percent more waste brine per day than the process according to the present invention.

As discussed and illustrated hereinbefore, the present invention provides numerous advantages in the selective removal of certain ions from a liquid. As shown with regard to nitrate removal from drinking water, many distinct advantages over prior art methods are attained. There is a dramatic reduction in waste brine production due to the high efficiency of nitrate removal by the ion exchange unit. Due to the selective removal of nitrate and the retention of virtually all the more desirable ions in the water that is produced, the process in preferred embodiments provides improved water quality with regard to health, corrosive and scaling properties. The ultimate use of both membrane permeate and reject portions means that the membrane unit itself can approach 100 percent recovery of water in preferred embodiments. Organic chemical fouling of the ion exchange resin is substantially eliminated. Use of the membrane also provides a filtering effect that prevents bacterial contamination of the ion exchange column and limits bacterial fouling (if any) to the membrane surface. In addition, this apparatus reduces organic food supply to any bacteria present in the ion exchange column. The concentration by the membrane element of certain contaminants, such as pesticidal and herbicidal chemicals, makes their removal through standard means easier and much more efficient. The possibility of discharging contaminants from the ion exchange column is therefore eliminated. Since the nitrates which have been removed are now more concentrated in the waste brine, denitrification by other means such as biological techniques becomes much easier.

It will be recognized by those skilled in the art that the present invention may be embodied in other specific forms in addition to those exemplified above without departing from the spirit or essential characteristics thereof. The examples therefore are intended to illustrate but not otherwise limit the invention.

What is claimed is:

1. An improved sorption process for removal of a first ion from a liquid feed containing the first and a second ion, which process is characterized by the steps of:
   (a) contacting a first side of an ion-selective, nanofiltration membrane having a chemical potential difference for the first and second ions across the membrane with the liquid feed so as to separate the liquid into first and second portions, the first portion comprising a lower concentration of the second ion than the liquid feed and a lower ratio of the second ion to the first ion than the liquid feed, and
   (b) contacting the first portion of the liquid with a sorbant so as to sorb the first ion.

2. The process according to claim 1 wherein the sorption process is ion exchange and the sorbant is an ion exchange resin.

3. The process according to claim 2 wherein the second portion of the liquid is the reject stream from the membrane and the first portion is the membrane permeate.

4. An improved sorption process for removal of a first ion from a liquid feed containing the first and a second ion, which process is characterized by the steps of:
   (a) contacting a first side of an ion-selective membrane having a chemical potential difference for the first and second ions across the membrane with the liquid feed so as to separate the liquid into first and second portions, the first portion comprising a lower concentration of the second ion than the liquid feed and a lower ratio of the second ion to the first ion than the liquid feed, wherein the second portion of the liquid is the reject stream and the first portion is the permeate stream from the membrane,
   (b) contacting the first portion of the liquid with an ion exchange resin so as to sorb the first ion; and
   (c) after sorption of the first ion, combining the permeate with the reject.

5. The process according to claim 4 wherein the first ion is nitrate ion, the second ion is sulfate ion and the liquid is water.

6. The process according to claim 5 wherein the membrane comprises a thin film composite reverse osmosis membrane having a polyamide discriminating layer prepared by the reaction of piperazine and/or a substituted piperazine with one or more acid halides.

7. The process according to claim 6 wherein the membrane comprises a thin film composite membrane having a polyamide discriminating layer prepared by polymerization of piperazine with trimesoyl chloride and optionally isophthaloyl chloride.

8. A sorption apparatus for the removal of a first ion from a liquid also containing a second ion, said apparatus comprising:
   (a) an ion-selective nanofiltration membrane adapted so that when the liquid contacts a first surface of the membrane: the liquid is separated into two portions, the first portion comprising a lower concentration of the second ion and a lower ratio of the second ion to the first ion than in the original liquid, and
   (b) a sorption element which receives the first portion from the membrane and removes the first ion.

* * * * *